(12) United States Patent
Malik, Sr.

(10) Patent No.: US 8,392,518 B2
(45) Date of Patent: *Mar. 5, 2013

(54) COMPOSING ELECTRONIC MAIL ATTACHMENTS IN AN ELECTRONIC MESSAGE

(75) Inventor: Dale W. Malik, Sr., Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 189 days.

This patent is subject to a terminal disclaimer.

(21) Appl. No.: 12/624,954

(22) Filed: Nov. 24, 2009

(65) Prior Publication Data

US 2010/0070602 A1     Mar. 18, 2010

Related U.S. Application Data

(60) Continuation of application No. 10/977,862, filed on Oct. 29, 2004, now Pat. No. 7,627,637, which is a division of application No. 09/563,931, filed on May 4, 2000, now Pat. No. 6,898,622.

(51) Int. Cl.
    *G06F 15/16*      (2006.01)
(52) U.S. Cl. ........................................ 709/206; 715/752
(58) Field of Classification Search .................. 709/206, 709/207, 208, 203; 715/752
See application file for complete search history.

(56) References Cited

U.S. PATENT DOCUMENTS

| | | | |
|---|---|---|---|
| 5,418,908 A | 5/1995 | Keller | |
| 5,781,901 A | 7/1998 | Kuzma | |
| 5,870,089 A | 2/1999 | Fabbio | |
| 5,903,723 A | 5/1999 | Beck et al. | |
| 6,073,133 A | 6/2000 | Chrabaszcz | |
| 6,212,553 B1 | 4/2001 | Lee et al. | |
| 6,272,485 B1 | 8/2001 | Sragner | |
| 6,360,252 B1 | 3/2002 | Rudy | |
| 6,405,225 B1 | 6/2002 | Apfel et al. | |
| 6,460,074 B1 | 10/2002 | Fishkin | |
| 6,505,237 B2 | 1/2003 | Beyda et al. | |
| 6,859,213 B1 | 2/2005 | Carter | |
| 6,898,622 B1 * | 5/2005 | Malik ........................... | 709/206 |
| 7,627,637 B2 * | 12/2009 | Malik ........................... | 709/206 |

OTHER PUBLICATIONS

Malik; Advisory Action mailed Dec. 19, 2003 for U.S. Appl. No. 09/563,931, filed May 4, 2000.
Malik; Final Rejection mailed Sep. 8, 2003 for U.S. Appl. No. 09/563,931, filed May 4, 2000.
Malik; Non-Final Rejection mailed Mar. 25, 2003 for U.S. Appl. No. 09/563,931, filed May 4, 2000.
Malik; Notice of Allowance and Fees Due mailed Jul. 12, 2004 for U.S. Appl. No. 09/563,931, filed May 4, 2000.
Malik; Restriction Requirement mailed Mar. 22, 2004 for U.S. Appl. No. 09/563,931, filed May 4, 2000.
Malik; U.S. Appl. No. 09/563,931, filed May 4, 2000.
Southwest Missouri State University; "Introduction to Microsoft", Computer Services, Southwest Missouri State University, Springfield, MO; 1998; 39 pages.

\* cited by examiner

*Primary Examiner* — Moustafa M Meky

(57) ABSTRACT

The present invention is directed to a method and system for composing a package of application files to be sent as e-mail attachments in e-mail communications. A plurality of data structures are created, wherein each data structure groups together a plurality of different user application files designated as attachments to an e-mail communication. Application files designated from within user applications are associated with selected data structures, such that each designated application file is associated with a selected data structure. During composition of an e-mail communication having attachments, a list of the data structures containing application files are provided.

20 Claims, 8 Drawing Sheets

You have designated filename as an attachment. Please enter a name to identify the attachment?

Please choose a package for _______________
- o  Create New package?
    - Package Name _______________
- o  Select From An Existing Package
    - o  Package Name 1
    - o  Package Name 2
    - o  Package Name 3
    - o  . . .

COMPOSING ELECTRONIC MAIL ATTACHMENTS IN AN ELECTRONIC MESSAGE

CROSS-REFERENCE TO RELATED APPLICATION

This application is a continuation of U.S. utility application, entitled "Composing Packages of Electronic Mail Attachments," having Ser. No. 10/977,862, filed Oct. 29, 2004, which itself is a divisional of copending U.S. utility application entitled, "Method for Composing Packages of Electronic Mail Attachments," having Ser. No. 09/563,931, filed May 4, 2000, and issuing as U.S. Pat. No. 6,898,622. Each of the foregoing applications is entirely incorporated herein by reference.

FIELD OF THE INVENTION

The present invention relates to the transmission of electronic mail over computer networks, and more particularly, to a method and apparatus for composing packages of application files to be transmitted as attachments to electronic mail by designating files from the user application.

DESCRIPTION OF THE RELATED ART

During the past decade, electronic mail ("e-mail") has become an indispensable tool for facilitating business and personal communications. Through computer networking systems such as local-area networks ("LAN"), wide-area networks ("WAN"), and the world-wide web ("WWW"), network users can send and receive notes, messages, letters, etc., to communicate with others who are in the same office or perhaps in remote locations across the world.

E-mail application programs are typically configured for generating messages in the form of memoranda. These programs guide a user to "compose" an e-mail message by providing a platform for entering at least one outgoing e-mail address, a "subject" heading, and a "body" for the actual message. When the user completes typing the message and presses the "send" key, the message is transmitted over the network and arrives at the provided destination address. E-mail is often used for sending relatively short messages that are only a few sentences in length.

Most e-mail application programs also allow a user to attach a file to be sent along with a message as an "attachment." In the accompanying e-mail message, the sender may introduce or explain the significance of the attachments. Attachment files might include word processing documents, graphics files, executable programs, spreadsheet reports, etc. A recipient will receive the e-mail message plus any attached files, which may then be opened and accessed through the appropriate application software. In many applications, it is preferable to send documents through e-mail attachments instead of a facsimile because the recipient can then store, edit, and print an original file. For long-distance communications, it is also less costly to send documents via e-mail as compared with a facsimile.

In order to send an attachment with most e-mail application programs, a user first composes a message in the ordinary course by specifying a destination address, a subject heading, and a message. The user then selects the "attachment" icon and selects a file that is stored in memory or on floppy disk. Upon selecting a file and selecting the "ok" icon, the user finally selects the "send" option to begin transmission of the e-mail.

Although many currently available e-mail application programs enable a user to send attachments to messages as part of an e-mail communication, there are several problems that users often encounter when sending e-mail attachment files. As an initial matter, it is relatively common for a user to forget to send an attachment along with a message when composing an e-mail. In some circumstances, this can lead to confusion, or at least embarrassment because the user referred in the sent message to an attached file that has not been sent. Other times, the user may be aware that an attachment file needs to be included in an e-mail application, but may not remember the name of the file. The user then must perform an extensive search using file management systems in order to locate the appropriate file to be attached. Another frequently encountered problem is that the user might remember to send some, but not all of the attachments that were intended. These problems significantly reduce the benefits of e-mail systems and may negatively affect a user's productivity when engaging in electronic mail communications.

SUMMARY OF THE INVENTION

In view of the difficulties encountered with sending attachments to e-mail communications described above, there is a need for a method and apparatus for assisting a user to properly configure an e-mail communication to include the transmission of desired attachment files.

The present invention provides a method for composing packages of e-mail attachment files for e-mail communications. A plurality of data structures are created, wherein each data structure groups together a plurality of different user application files designated as attachments to an e-mail communication. Application files are designated from within user applications and are associated with selected data structures, such that each designated application file is associated with a selected data structure. The system then provides a list of the data structures containing application files during composition of an e-mail communication having attachments.

The present invention also provides a data structure representing a collection of attachment files designated to be transmitted as part of an e-mail communication. The data structure includes a package name field for storing a user-defined name for identifying the package and a package header field for storing information regarding the configuration of the package. For each attachment file designated within the collection, the data structure also includes an attachment file name field for storing a user-defined name for identifying the attachment file, an attachment file header field for storing information regarding the configuration of the attachment file, and a pointer to a user application file designated as the attachment file.

Another aspect of the present invention is a system for composing packages of e-mail attachment files for e-mail communications. This includes a plurality of data structures, each data structure grouping together a plurality of different user application files designated as attachments to an e-mail communication. A packaging file manager designates user application files from within respective user applications to selected data structures, such that each designated application file is associated with a selected data structure. An e-mail application user interface provides a listing of the data structures containing user application files generated by the packaging file manager during composition of an e-mail communication having attachments.

In yet another aspect of the invention, a method is provided for composing packages of e-mail attachment files for e-mail communications. A plurality of data structures are created, wherein each data structure groups together a plurality of different user application files designated as attachments to an e-mail communication. Application files are designated from within user applications and associated with selected data structures, such that each designated application file is associated with a selected data structure. The text of a message in an e-mail communication being composed is checked for the presence of any terms or phrases indicative of a user's intent in an e-mail message to send an e-mail attachment in an e-mail communication. The e-mail communication is also checked for the presence of an e-mail attachment. Upon detecting the presence of any of the terms or phrases and the absence of an e-mail attachment file in the e-mail communication being composed, a list of the data structures is provided.

In yet another aspect of the invention, a system for composing packages of e-mail attachment files for e-mail communications is provided. This includes a plurality, of data structures, each data structure grouping together a plurality of different user application files designated as attachments to an e-mail communication. A packaging file manager designates user application files from within respective user applications to selected data structures, such that each designated application file is associated with a selected data structure. An e-mail application user interface provides a listing of the data structures containing user application files generated by the packaging file manager upon detecting the presence of terms or phrases indicative of a user's intent in an e-mail message to send an e-mail attachment during the composition of an e-mail communication.

The present invention additionally provides for a method for composing packages of e-mail attachment files for e-mail communications. A plurality of data structures are created, wherein each data structure groups together a plurality of different user application files designated as attachments to an e-mail communication. Application files designated from within user applications are associated with selected data structures, such that each designated application file is associated with a selected data structure. A menu of options is displayed for composing an e-mail communication comprised of one or more types, and at least one user-selected option at a user interface is received. If the user-selection option includes at least one e-mail attachment, a list of the data structures containing application files in a template for configuring an e-mail attachment to an a-mail communication is provided.

DETAILED DESCRIPTION OF PREFERRED EMBODIMENTS OF THE INVENTION

Figure 1:
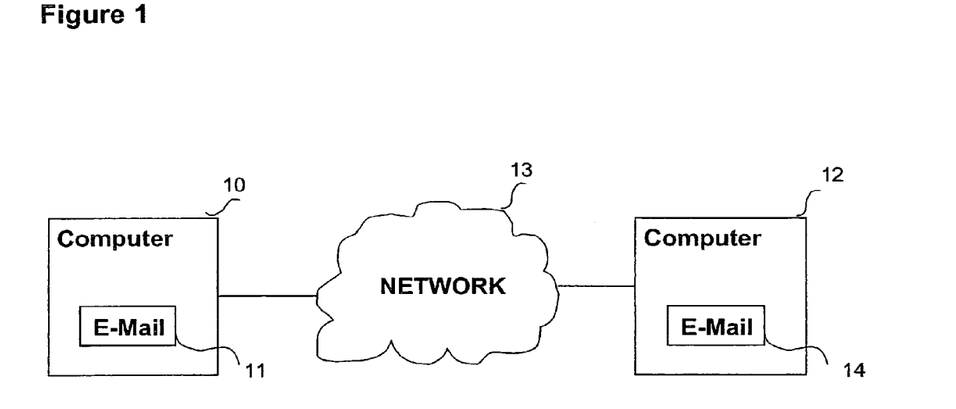
FIG. 1 is a schematic diagram of a basic computer network system according to an embodiment of the present invention.

The present invention will now be described in more detail with reference to the figures. FIG. 1 is a schematic diagram of a basic computer network system in accordance with a preferred embodiment of the present invention, in which computer 10 is connected to computer 12 through a network 13 to facilitate e-mail communications with attachments. Computer 10 has an e-mail communications user interface 11 that permits the computer to send e-mail communications using network 13. Likewise, computer 12 has an e-mail communications user interface 14 that permits the computer to receive e-mail communications from network 13. The term computer in this description is not limited to any particular type of computer, and may include computer systems having many computers, or only a portion of a computer. Network 13 can be in the form of a wired network or a wireless network. The network may be a simple, single communication path, or it may include one or several LAN or WAN, the world wide web, or any combination thereof. Computers 10 and 12 may be the only computers connected to the network 13, or the network may be shared by many other computers.

The present invention provides an interface between an e-mail application program and a variety of other user applications that a user accesses during normal usage of a computer. Examples of such user applications include, but are not limited to, word processing programs, spreadsheet programs, math equation editors, presentation software, graphics editors, paint programs, multimedia audio and video programs, and internet-based programs. During the time that a user accesses an application file in a user application, the user can designate the file to be a part of a new or an existing package of application files. The packages of application files, as defined by the user, can then be included as an e-mail attachment in a future e-mail communication.

Figure 2:
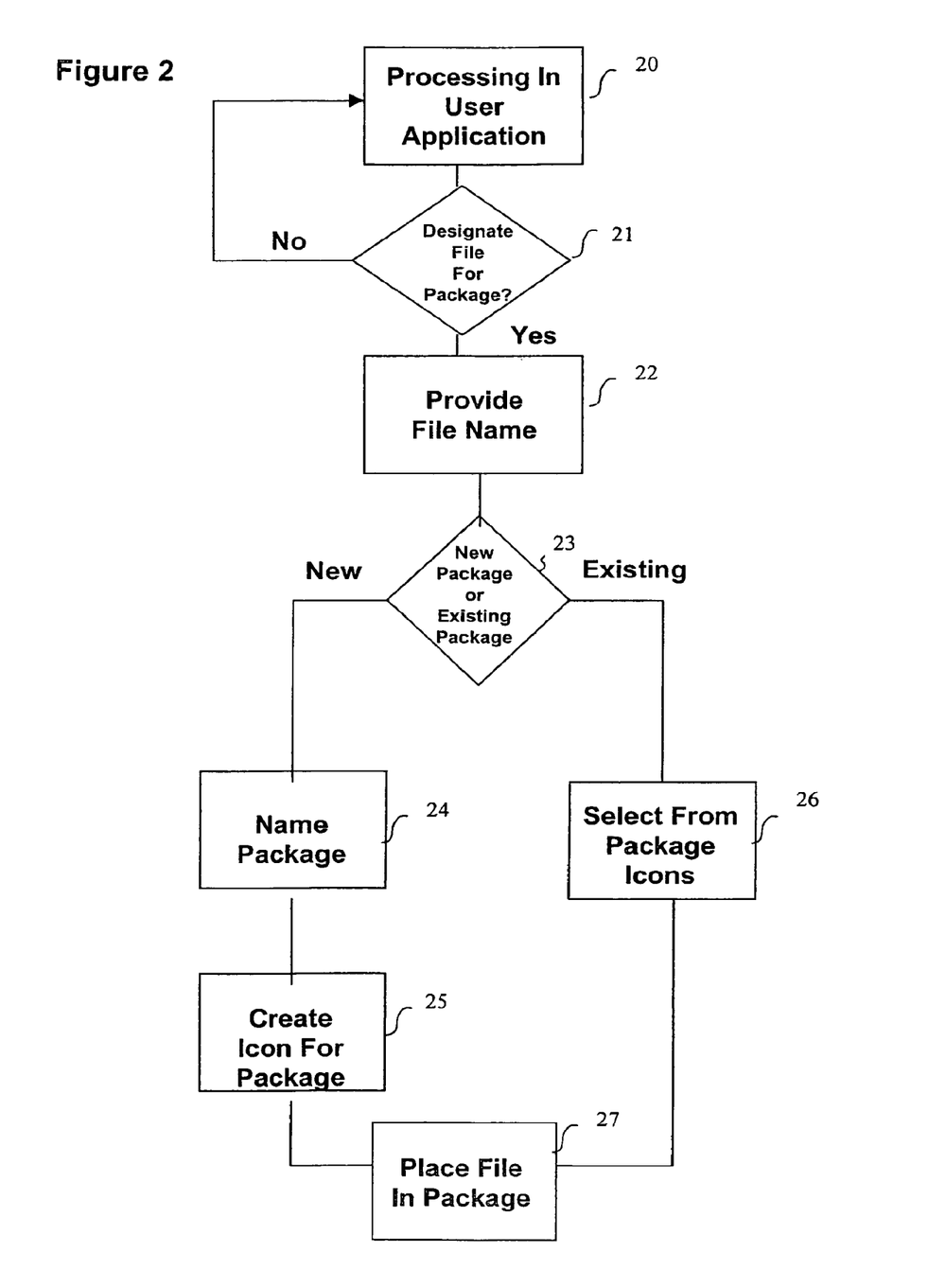
FIG. 2 is a flow diagram providing a method for designating an attachment file into a package according to an embodiment of the present invention.

FIG. 2 provides a flow diagram illustrating how the e-mail application interfaces with a user application to coordinate the composition of packages of designated files for attachments. A user opens a user application, as in step 20, and begins to process an application file in the normal course. In this context, processing may include creating a new file, or opening and editing an existing file. The application files may be in a text format or any graphics, audio/video, or multimedia-type format. Graphics files might include jpeg, tif, or gif files. At any time during processing of the file, the user may choose to designate the application file for a package, as in step 21. This may be done by selecting an icon that is overlaid onto the screen of the user application. Alternatively, the user application itself may incorporate a macro within its menu or in its "toolbar" for creating e-mail attachment packages.

If the user designates the file for an attachment, the user is then prompted to supply a file name, as in step 22. Under most circumstances, the user will wish to maintain the same name as that of the existing file, which can be provided as the default. However, the user may wish to change the name associated with the attachment file, in order to be more convenient or appropriate for the intended recipient of the attachment. For example, the user may name an application file according to an internal billing or reference code, but may choose to rename the designated attachment file as one that the recipient will recognize.

The user is then prompted to select an appropriate package for the designated file, in step 23. As one option, the user may choose to create a new package. If so, the system prompts the user to identify a package name, step 24, and creates an icon that is to be associated with the package, in step 25. If the user wishes to add the attachment file to an existing package, the system prompts the user to select from a list of packages, by name or by icon, or to provide the desired package name, in step 26. In step 27, the user application file is then designated as an attachment for a particularly defined package.

Figure 3:
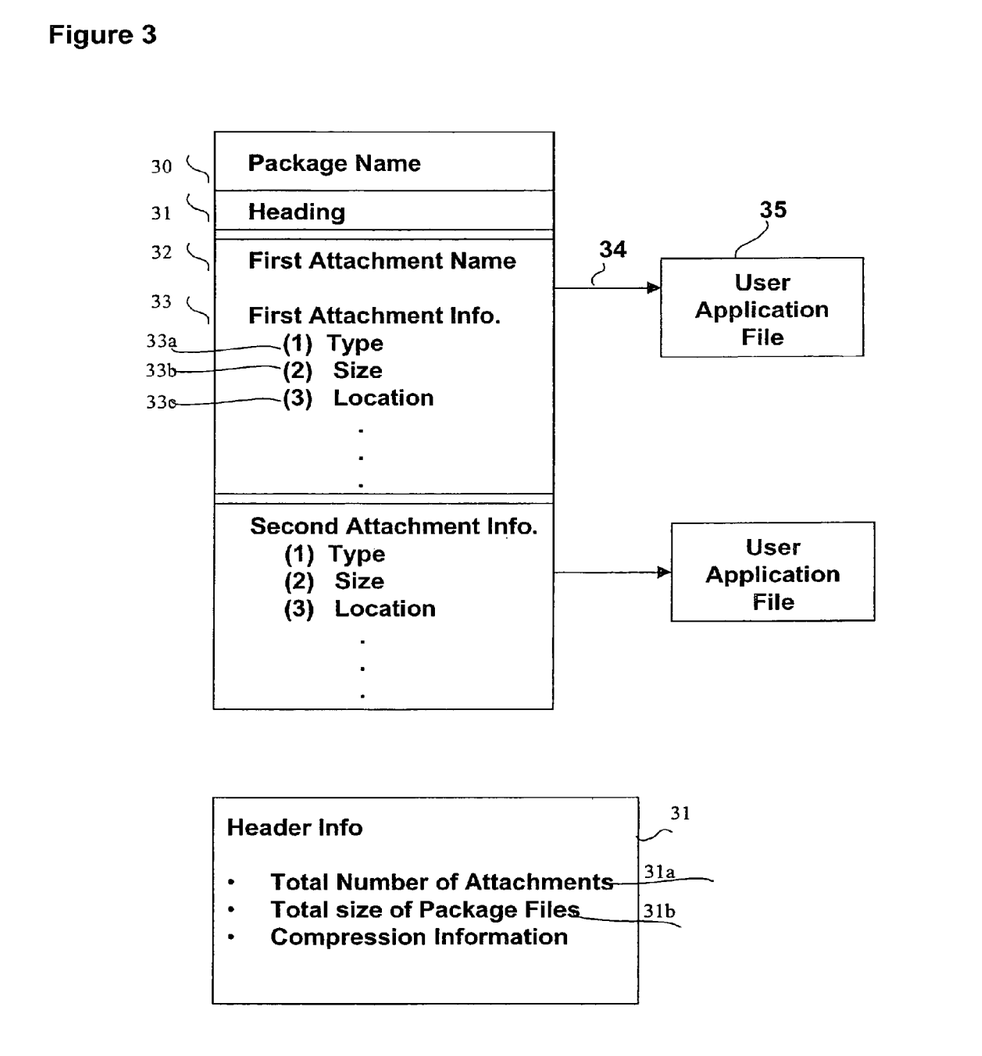
FIG. 3 is a schematic diagram illustrating a data structure for a package according to an embodiment of the present invention.

In accordance with one embodiment, a pointer or link is then associated between the application file and a data structure for the package, as illustrated with reference to FIG. 3. The data structure contains the package name 30 defined to identify the package. The header information 31 stores information about the package itself, which may include the number of attachment files currently associated with the package 31a, the total size of the combination of attachment files 31b, and information regarding the capabilities for compressing the file. For each file designated as an attachment and associated with the package, the data structure includes the user-defined attachment name 32, which may differ from the user application file name, and general attachment file information 33, including the file type 33a, file size 33b, file location 33c, etc. A pointer or link from the attachment information 33 to the user application file 35 is maintained.

Figure 4:
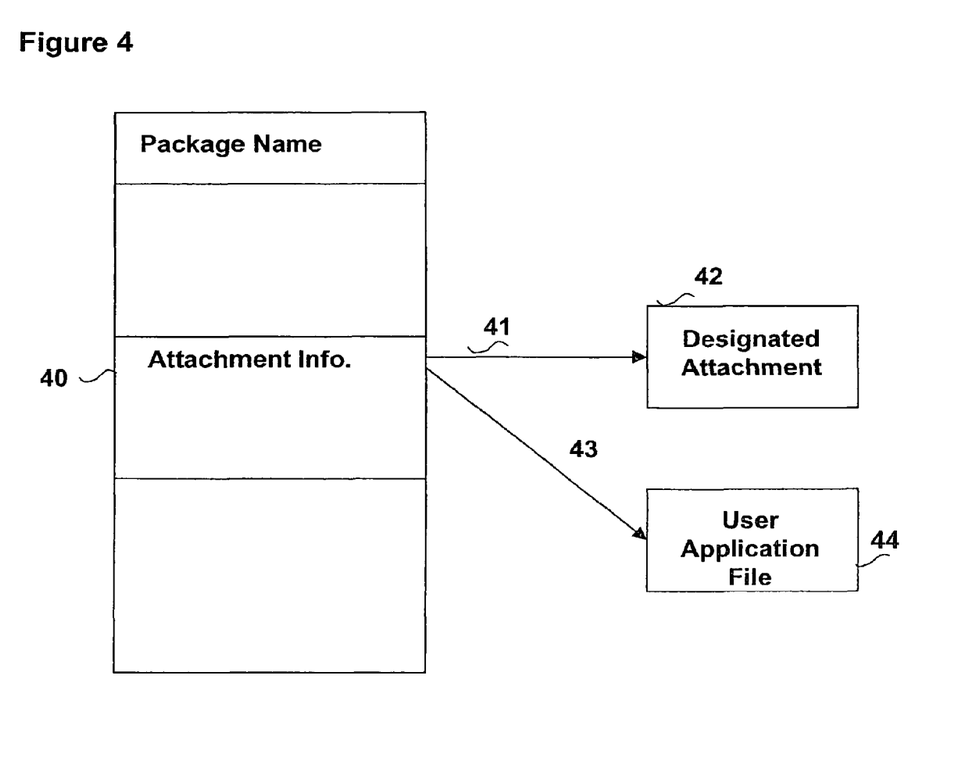
FIG. 4 is a schematic diagram illustrating a data structure for a package according to an alternative embodiment of the present invention.

In an alternative embodiment, a copy of the user application file is made and stored as a separate file. In this data structure, as shown in FIG. 4, the attachment information portion 40 maintains a link or pointer 41 to a new copy of the user application file, stored as designated attachment 42. In this embodiment, when a user application file is designated as an attachment, a copy is made of the user application file in its current form. Any subsequent edits to the user application after the user designates the file in a package are not automatically incorporated into the attachment file. However, because the user may desire to transmit the latest version of the user application, a second pointer is also maintained 43 to the user application file 44. When the user enters the e-mail application and requests to include a particular package as an attachment, the system can detect whether the user application file 44 has changed from the designated attachment 42, and the user can choose which file to include in the package. Although it is more cumbersome to store a separate copy of the user application file to be attached, this embodiment provides additional functionality for the user.

Figure 5:
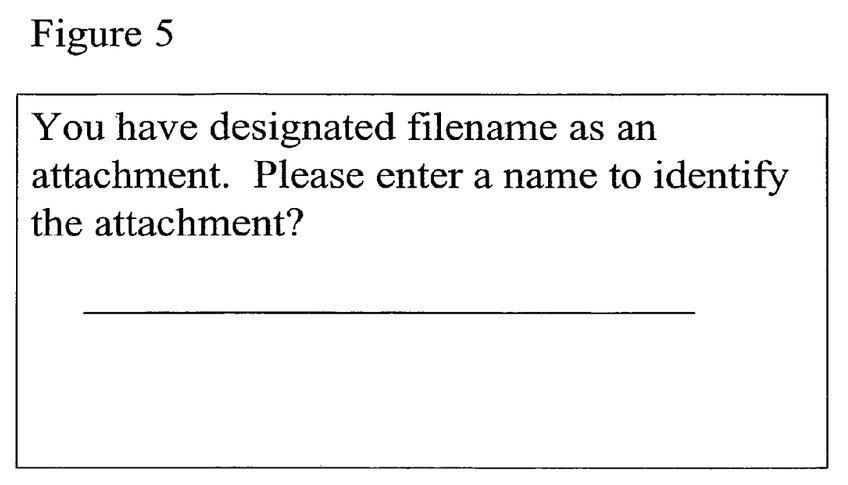
FIG. 5 is a graphical user interface for designating a user application file as an attachment file according to an embodiment of the present invention.

FIG. 5 provides an illustration of a graphical user interface (GUI) of the packaging file manager according to the preferred embodiment. Within the user application, once the user selects an icon or otherwise runs a macro to designate a user application file as an attachment, a screen such as that shown in FIG. 5 appears, which is overlaid on the presently active user application display with the user application file. The user is queried to enter a new file name for the application file that is to be designated as an attachment. In the preferred embodiment, the existing application file name is presented as a default.

Figure 6:
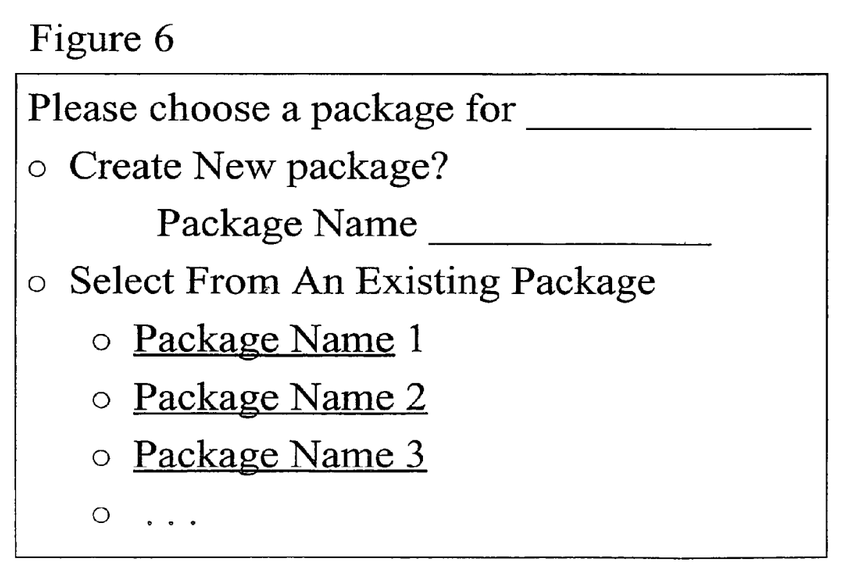
FIG. 6 is a graphical user interface for designating a user application file in a package according to an embodiment of the present invention.

After the user provides a file name, a second screen is presented for the user to identify the package with which the file is to be associated. FIG. 6 provides an example of a GUI menu that allows the user to choose between a new package or an existing package. In response to a user's request, the system will provide a list of all of the attachment files that are currently affiliated with an existing package that the user identifies.

Figure 7:
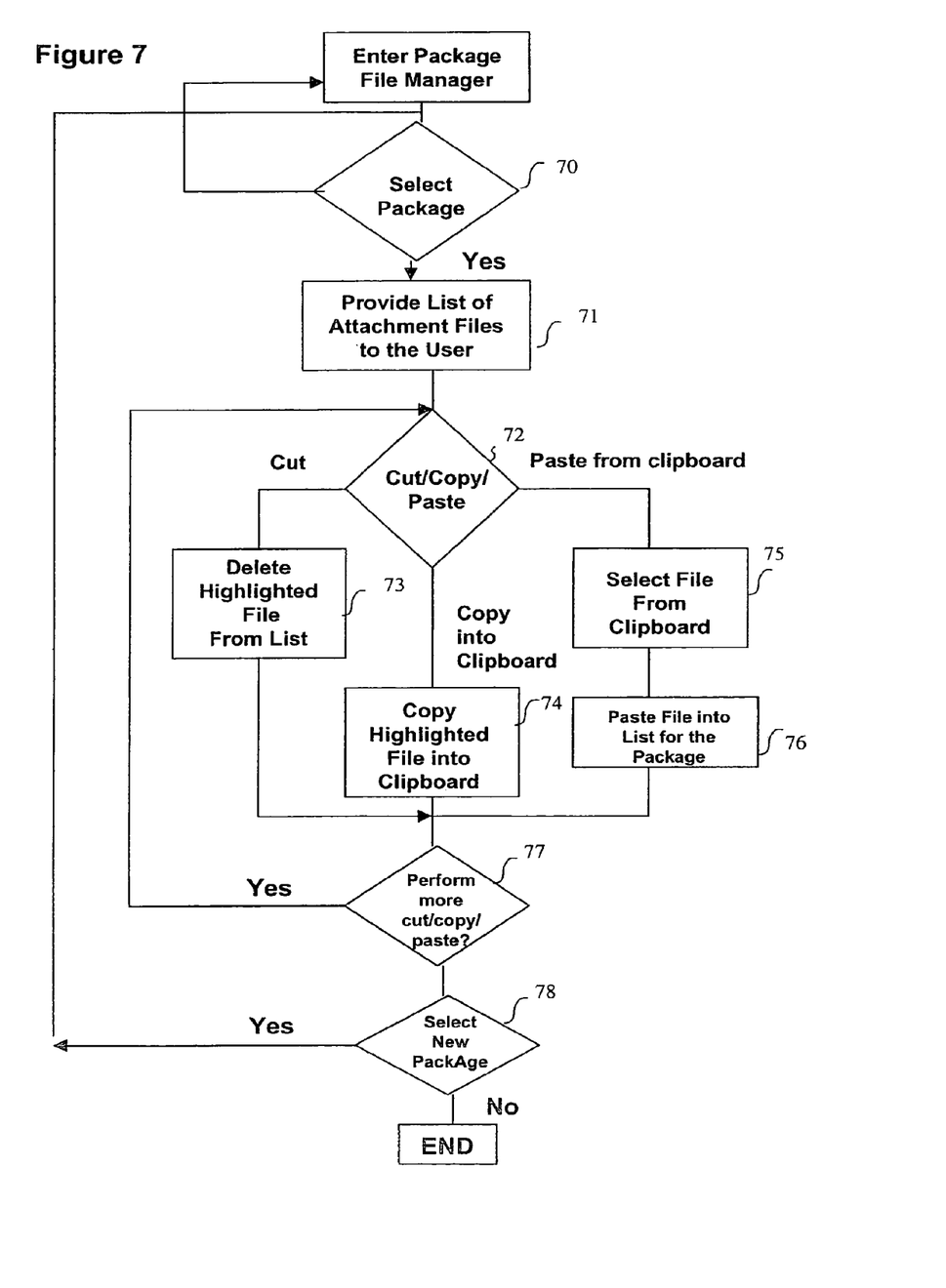
FIG. 7 is a flow diagram illustrating a method for editing packages of attachment files according to an embodiment of the present invention.

The user can later edit the composition of the packages as provided in FIG. 7. Upon entering the packaging file manager, the user can opt to edit a package, as in step 70. The user can then select the package to be edited. A list of attachment files that are currently associated with the package are provided to the user, in step 71. The user can choose in step 72 to cut any one or more files from the list to perform a deletion in step 73, copy any of the files to a clipboard in step 74, or paste any files from the clipboard to the package list in step 75. The user can continually select other files to add or delete from the packages, in step 77, or switch files from one package to another, in step 78. The user can also separately add existing files to package lists, such as files that the user received as attachments from e-mail communications, which the user may wish to forward to others.

The packaging file manager can be incorporated directly into an e-mail application, or can be managed separately but interactively with the e-mail application. In either event, the functionality of the system is transparent to the user. When the user designates an intention to transmit at least one package in the e-mail application, the package file manager will become active to allow the user to select a package for transmission from a list of pre-configured packages. During this time, the user may also be given the option to edit the packages, as described above in accordance with FIG. 7. When the package file manager is a separate system that interacts with the e-mail application, a macro is provided within the e-mail application that is run when the user indicates an intention to transmit a package. Quite similarly, as an integrated system, the package file manager is run directly from within the e-mail application when the user desires to send a package.

The packaging file manager can also be incorporated with an e-mail application that provides other features for reminding a user to include e-mail attachments with e-mail communications. For example, in an e-mail application system as provided in FIG. 8, a checking operation is performed before an e-mail is transmitted. As in conventional e-mail application programs, the user composes an e-mail communication in accordance with a template provided by the application, as shown as step 80. When the user indicates the completion of the composition of the message, shown as step 81, a checking system is triggered to perform an e-mail attachment consistency analysis. The e-mail application program first parses through the language provided by the user in the e-mail message, shown as step 82. The system searches for words or phrases such as "ATTACHED," "ENCLOSED," "HERE IT IS," "AS PROMISED," "VERSION," or the like. In step 83, the system determines whether one of the words or phrases is present. If the system does not detect the presence of one of these words or phrases, the e-mail communication is transmitted, as in step 88.

Figure 8:
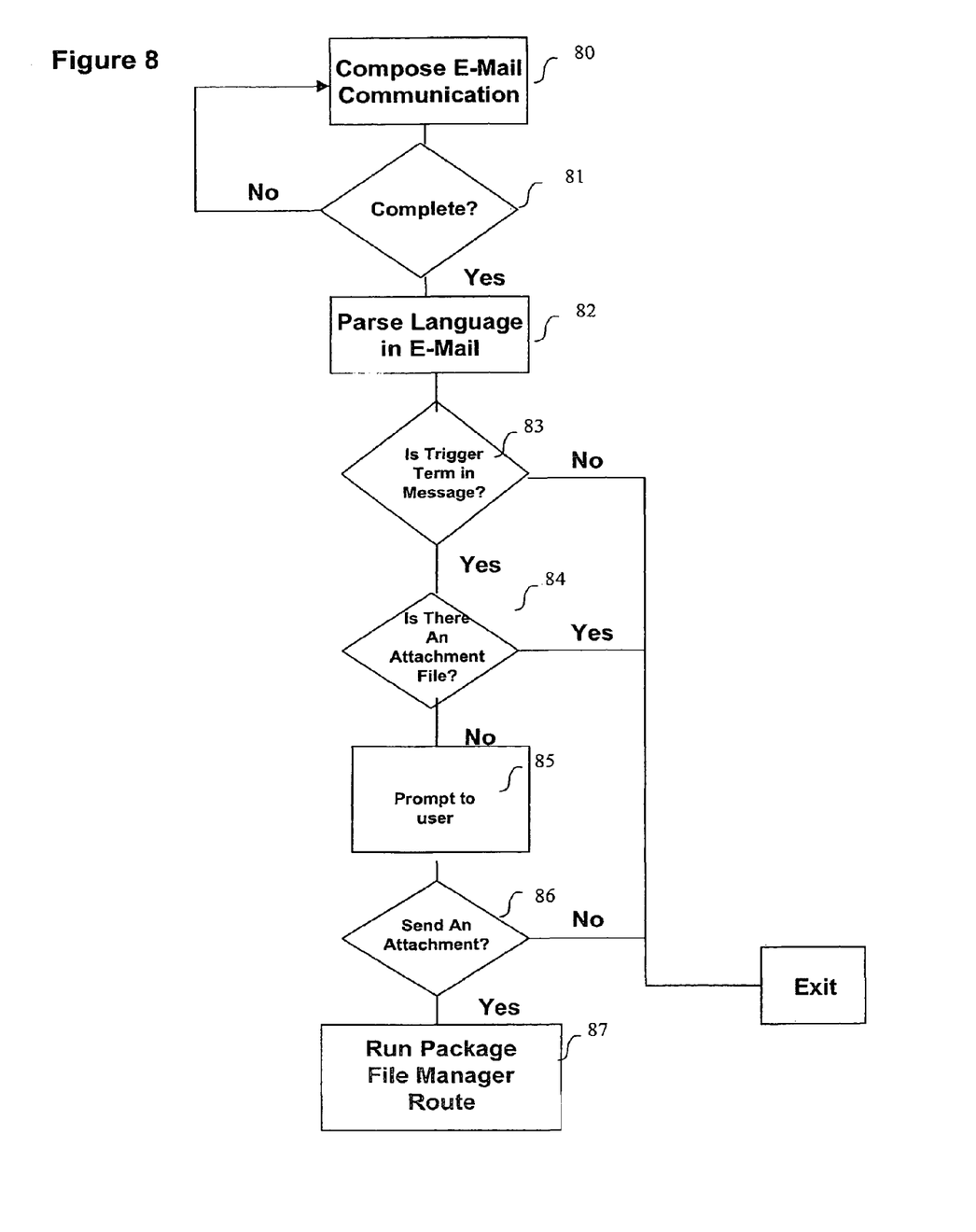
FIG. 8 is a flow diagram for performing error checking analysis of an e-mail message according to an embodiment of the present invention.

If the system detects one or more of the words or phrases identified above, a consistency checker first searches for an attachment file that is to be sent along with the e-mail message, shown as step 84. The system next determines whether the user provided an attachment file. If an attachment file exists, the e-mail communication is transmitted. However, if no attachment file exists, the e-mail application program interrupts the user with a warning message, shown as step 85. The user is then asked whether an attachment file was intended to be placed along with the e-mail message, as in step 86. If the user indicates that he intended to send an attachment, the package file manager routine is run to query the user to identify a package, in step 87.

The package file manager can also be incorporated into a menu-driven e-mail application interface that prompts the user to identify at the outset whether he intends to send e-mail attachments. The user chooses the type and category associated with the e-mail communication to be composed according to a menu provided to the user. The user can then select options and features from the menu, which govern the configuration of the resulting e-mail communication. The user can opt to customize the menu to add or remove features in order to facilitate rapid composition of e-mail communications.

Figure 9:
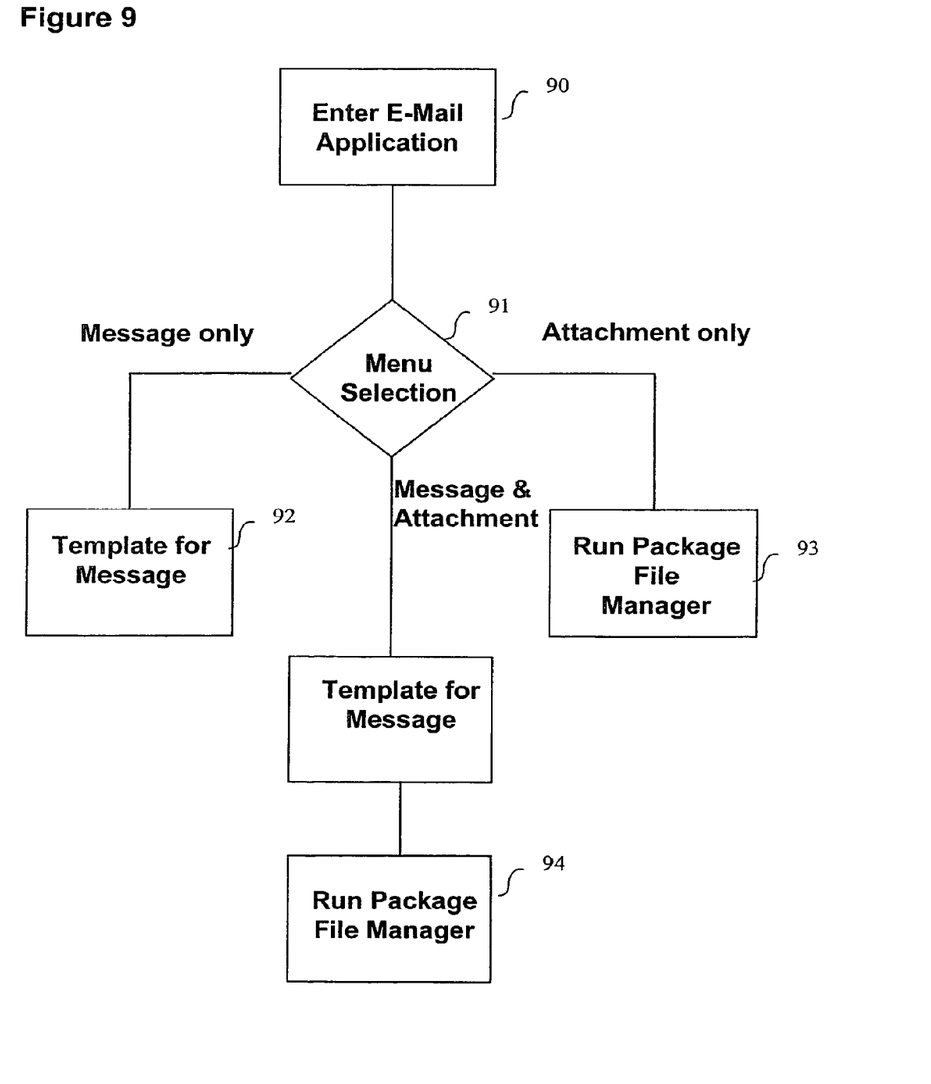
FIG. 9 is a flow diagram of an e-mail menu configuration embodiment of the present invention.

FIG. 9 illustrates the operation of the e-mail configuration application according to this embodiment. Upon the selection of the e-mail communication application 90, the system first prompts the user to select from a menu the type of e-mail communication that is to be transmitted, as in step 91. Once the user chooses from the menu of e-mail communication categories, the system configures the e-mail communication to facilitate composition of each requisite portion of the desired e-mail communication. If the user chooses simply to send an e-mail message, a template is provided in step 92 for the user to enter the intended recipient's e-mail address, the subject matter, and a message. If the user chooses to send an e-mail attachment, the package file manager subroutine is run in step 93, which allows the user to select a list of attachments predesignated as a package, as described above.

As can be readily seen, the package file manager and the system and method for composing electronic mail as packages from within user applications provides several advantages to the user for composing e-mail communications. The system allows the user to organize e-mail communications during the time when the application files that are to be transmitted are generated. This may be quite beneficial for users who might otherwise forget to include such application files when later composing an e-mail communication. By providing to the user designated attachment files as lists within packages, the system can assist the user in more effectively organizing and tracking e-mail communications, such that the user need not remember to separately select each attachment. The package file manager also provides an organized system for editing the composition of lists of attachment files that may be generated from a variety of sources. By separately storing a copy of all user application files as new attachment files, the system also provides the user with the option to transmit an earlier version of the present user application file. Thus, the method and system of the present invention provides for improved e-mail communications when e-mail attachments are to be transmitted from the user's computer to another.

The foregoing disclosure of embodiments of the present invention and specific examples illustrating the present invention have been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claimed appended hereto, and by their equivalents.

Therefore, having thus described the disclosure, at least the following is claimed:

1. A method for storing software modules for configuring electronic communications with attachments comprising:
   prompting, via a computer, a user to select one or more application files that are to be attached as attachments in an electronic message; and
   during composition of the electronic message, presenting a graphical menu, via the computer, for the user to choose whether to replace a copy of an application file selected to be attached to the electronic message when the application file has been detected to have been changed since a copy of the application file was made for inclusion in the electronic message or to let the copy of the application file be attached to the electronic message without replacement.

2. The method of claim 1, wherein a selected application file comprises a collection of individual application files that have been assembled as a single data structure.

3. The method of claim 2, further comprising:
   assembling the collection of individual application files as the single data structure for inclusion in the electronic message as an attachment.

4. The method of claim 3, wherein the single data structure comprises:
   a package name field for storing a user-defined name for identifying the data structure;
   a package header field for storing information regarding the configuration of the data structure; and
   for each application file designated within the data structure:
      an attachment file name field for storing a user-defined name for identifying the application file; and
      a copy of the application file.

5. The method of claim 1, further comprising:
   checking for presence of any textual terms or phrases in the electronic message indicative of the user's intent to attach an attachment with the electronic message; and
   querying the user as to whether an attachment is intended to be included with the electronic message in response to positive detection of the presence of the textual terms or phrases.

6. The method of claim 5, further comprising:
   querying the user to identify an application file as the attachment that is intended to be included in the electronic message.

7. The method of claim 1, further comprising:
   checking for presence of any textual terms or phrases in the electronic message indicative of the user's intent to attach an attachment with the electronic message; and
   issuing a warning message in response to positive detection of the presence of the textual terms or phrases.

8. Computer memory for storing software modules for configuring electronic communications with attachments, the modules comprising:
   a messaging application user interface prompting a user to select one or more application files that are to be attached as attachments in an electronic message; and
   a composition application for composing the electronic message, wherein the messaging application user interface presents a graphical menu for the user to choose whether to replace a copy of an application file selected to be attached to the electronic message when the application file has been detected to have been changed since a copy of the application file was made for inclusion in the electronic message or to let the copy of the application file be attached to the electronic message without replacement.

9. The computer memory of claim 8, wherein a selected application file comprises a collection of individual application files that have been assembled as a single data structure.

10. The computer memory of claim 9, further comprising:
   a packaging file manager that assembles the collection of individual application files as the single data structure for inclusion in the electronic message as an attachment.

11. The computer memory of claim 10, wherein the single data structure comprises:
- a package name field for storing a user-defined name for identifying the data structure;
- a package header field for storing information regarding the configuration of the data structure; and
- for each application file designated within the data structure:
  - an attachment file name field for storing a user-defined name for identifying the application file; and
  - a copy of the application file.

12. The computer memory of claim 8, wherein the composition application checks for presence of any textual terms or phrases in the electronic message indicative of the user's intent to attach an attachment with the electronic message and directs the messaging application user interface to query the user as to whether an attachment is intended to be included with the electronic message in response to positive detection of the presence of the textual terms or phrases.

13. The computer memory of claim 12, wherein the composition application directs the messaging application user interface to query the user to identify an application file as the attachment that is intended to be included in the electronic message.

14. The computer memory of claim 8, wherein the composition application checks for presence of any textual terms or phrases in the electronic message indicative of the user's intent to attach an attachment with the electronic message and directs the messaging application user interface to issue a warning message in response to positive detection of the presence of the textual terms or phrases.

15. A system for storing software modules for configuring electronic communications with attachments comprising:
- a computer having a processor;
- a messaging application component, executed by the processor, prompting a user to select one or more application files that are to be attached as attachments in an electronic message; and
- a composition component, executed by the processor, composing the electronic message, wherein the messaging application component presents a graphical menu for the user to choose whether to replace a copy of an application file selected to be attached to the electronic message when the application file has been detected to have been changed since a copy of the application file was made for inclusion in the electronic message or to let the copy of the application file be attached to the electronic message without replacement.

16. The system of claim 15, wherein a selected application file comprises a collection of individual application files that have been assembled as a single data structure.

17. The system of claim 16, further comprising:
- a packaging file component that assembles the collection of individual application files as the single data structure for inclusion in the electronic message as an attachment.

18. The system of claim 17, wherein the single data structure comprises:
- a package name field for storing a user-defined name for identifying the data structure;
- a package header field for storing information regarding the configuration of the data structure; and
- for each application file designated within the data structure:
  - an attachment file name field for storing a user-defined name for identifying the application file; and
  - a copy of the application file.

19. The system of claim 15, wherein the composition component checks for presence of any textual terms or phrases in the electronic message indicative of the user's intent to attach an attachment with the electronic message and directs the messaging application component to query the user as to whether an attachment is intended to be included with the electronic message in response to positive detection of the presence of the textual terms or phrases.

20. The system of claim 19, wherein the composition component directs the messaging application component to query the user to identify an application file as the attachment that is intended to be included in the electronic message.

\* \* \* \* \*